United States Patent
Manabe

(10) Patent No.: US 10,619,253 B2
(45) Date of Patent: Apr. 14, 2020

(54) METHOD FOR ELECTROLYZING ALKALINE WATER

(71) Applicant: DE NORA PERMELEC LTD, Fujisawa-shi, Kanagawa (JP)

(72) Inventor: Akiyoshi Manabe, Fujisawa (JP)

(73) Assignee: DE NORA PERMELEC LTD, Fujisawa-shi, Kanagawa (JP)

( * ) Notice: Subject to any disclaimer, the term of this patent is extended or adjusted under 35 U.S.C. 154(b) by 70 days.

(21) Appl. No.: 15/775,267

(22) PCT Filed: Dec. 22, 2016

(86) PCT No.: PCT/JP2016/088293
§ 371 (c)(1),
(2) Date: May 10, 2018

(87) PCT Pub. No.: WO2017/115709
PCT Pub. Date: Jul. 6, 2017

(65) Prior Publication Data
US 2018/0334751 A1 Nov. 22, 2018

(30) Foreign Application Priority Data

Dec. 28, 2015 (JP) .................................. 2015-256496

(51) Int. Cl.
*C25B 1/10* (2006.01)
*C25B 15/08* (2006.01)
*C25B 11/04* (2006.01)

(52) U.S. Cl.
CPC ............ *C25B 1/10* (2013.01); *C25B 11/0405* (2013.01); *C25B 11/0415* (2013.01);
(Continued)

(58) Field of Classification Search
CPC ... C25B 1/10; C25B 11/0403; C25B 11/0473; C25B 15/08
See application file for complete search history.

(56) References Cited

U.S. PATENT DOCUMENTS

| | | |
|---|---|---|
| 9,890,062 B2 | 2/2018 | Manabe et al. |
| 2008/0257749 A1 | 10/2008 | Bulan et al. |

(Continued)

FOREIGN PATENT DOCUMENTS

| | | |
|---|---|---|
| CA | 2107442 | 4/1994 |
| CN | 101302624 | 11/2008 |

(Continued)

OTHER PUBLICATIONS

The extended European search report issued in European Patent Application No. 16881684.1, dated Jul. 24, 2019, 8 pages provided.

(Continued)

*Primary Examiner* — Nicholas A Smith
(74) *Attorney, Agent, or Firm* — Hamre, Schumann, Mueller & Larson, P.C.

(57) ABSTRACT

Provided is an alkaline water electrolysis method capable of reducing or preventing degradation in cathode and anode performance even in an operation of repeated cycles of frequent starting and stopping, and/or even in an operation involving a significant output variation.

The present invention provides an alkaline water electrolysis method including repeated cycles of intermittent operation, including an electrolysis step of performing alkaline water electrolysis including storing an electrolytic solution (16) in a circulation tank (5), feeding the electrolytic solution (16) in the circulation tank (5) to an anode chamber (2) and to a cathode chamber (3), returning an electrolytic solution generated in the cathode chamber (3) and an electrolytic solution generated in the anode chamber (2) to the circulation tank (5), mixing together these electrolytic solutions in the circulation tank (5), and recirculating the mixed electrolytic solution to the anode chamber (2) and to the cathode chamber (3), and a step of adding a catalyst activation material formed of a metal salt soluble in the electrolytic (Continued)

solution (16) prior to starting of the electrolysis step; and in the electrolysis step, a metal component in the catalyst activation material is deposited on a surface of the cathode.

9 Claims, 1 Drawing Sheet

(52) U.S. Cl.
CPC ...... *C25B 11/0452* (2013.01); *C25B 11/0473* (2013.01); *C25B 15/08* (2013.01); *Y02E 60/366* (2013.01)

(56) References Cited

U.S. PATENT DOCUMENTS

| | | | |
|---|---|---|---|
| 2010/0101955 A1 | 4/2010 | Nocera et al. | |
| 2012/0325674 A1 | 12/2012 | Bulan et al. | |
| 2016/0368789 A1* | 12/2016 | Manabe | C25B 1/04 |

FOREIGN PATENT DOCUMENTS

| | | |
|---|---|---|
| DE | 4232958 C1 | 9/1993 |
| EP | 3312304 A1 | 4/2018 |
| JP | 55-011132 | 1/1980 |
| JP | 57-051276 | 3/1982 |
| JP | 57-052432 | 11/1982 |
| JP | 57-198289 | 12/1982 |
| JP | 57-200581 | 12/1982 |
| JP | 58-136789 | 8/1983 |
| JP | 60-159184 | 8/1985 |
| JP | 61-010557 | 3/1986 |
| JP | 61-250189 | 11/1986 |
| JP | 64-011988 | 1/1989 |
| JP | 01-028837 | 6/1989 |
| JP | 06-212471 | 8/1994 |
| JP | 2007-107088 | 4/2007 |
| JP | 2007107089 A | 4/2007 |
| JP | 2008-179896 | 8/2008 |
| JP | 2009-179871 | 8/2009 |
| JP | 2009-242922 | 10/2009 |
| JP | 2013-213284 | 10/2013 |
| JP | 2015-029921 | 2/2015 |
| JP | 2015-129344 | 7/2015 |
| JP | 2015-183254 | 10/2015 |
| WO | 2015-014716 | 2/2015 |

OTHER PUBLICATIONS

Korean Office Action, issued in the corresponding Korean application No. 10-2018-7015603, dated Dec. 1, 2018, 9 pages (including machine translation).

First Office Action, issued in the corresponding Japanese patent application No. 2015-256496, dated Jul. 24, 2018, 6 pages including translation.

Chinese Office Action, issued in the corresponding Chinese application No. 201680076923.2, dated Feb. 27, 2018, 15 pages (including machine translation).

International Search Report, issued in the corresponding PCT application No. PCT/JP2016/088293, dated Mar. 21, 2017, 4 pages.

* cited by examiner

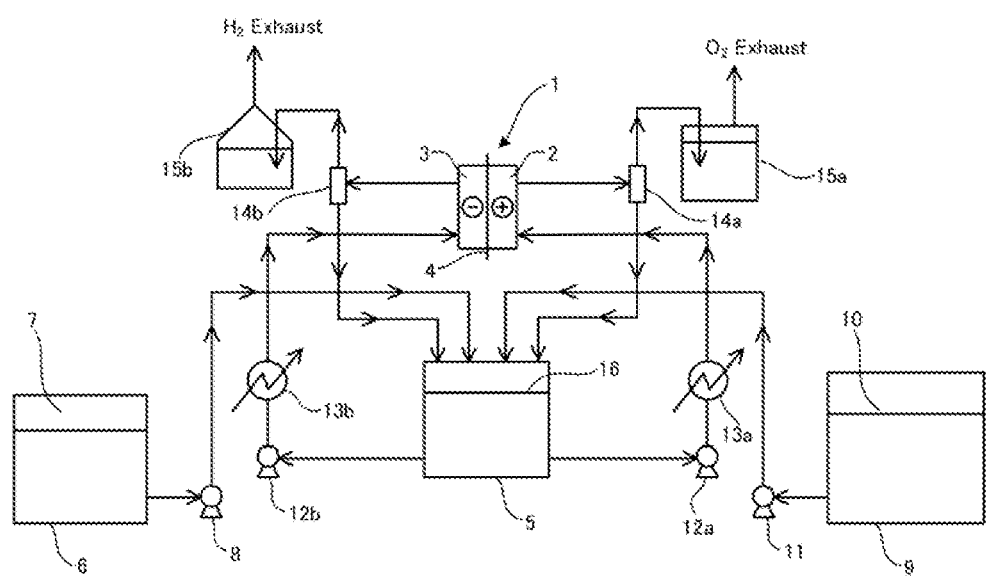

METHOD FOR ELECTROLYZING ALKALINE WATER

TECHNICAL FIELD

The present invention relates to an alkaline water electrolysis method for electrolyzing an alkaline electrolytic solution, and more particularly to an alkaline water electrolysis method suitable for repeated cycles of intermittent operation.

BACKGROUND ART

In recent years, attention has been given to hydrogen that is generated using renewable energy, such as a solar panel and wind power, as clean energy to help solve problems such as global warming caused by $CO_2$, decrease of fossil fuel reserve, and the like. Hydrogen is easy to store and transport, and is secondary energy that produces low stress on the environment. Thus, more attention is drawn to a hydrogen energy system that uses hydrogen as an energy carrier. Hydrogen is generated today primarily using a method such as steam reforming of fossil fuel. However, in consideration of problems such as global warming and future depletion of fossil fuel, more importance is being placed on large-scale hydrogen production by water electrolysis that uses, as the power source, renewable energy such as a solar panel or wind power.

The water electrolysis for producing hydrogen practically performed today can generally be grouped into two categories: alkaline water electrolysis and solid polymer electrolyte water electrolysis.

Large-scale hydrogen production using water electrolysis is more suitably performed by alkaline water electrolysis, which uses inexpensive material such as nickel and operates with a low surface pressure of electrolytic cell, than solid polymer electrolyte water electrolysis, which uses platinum-based noble metal in the electrodes. The electrode reaction in both electrodes proceeds as follows:

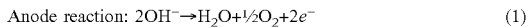

Anode reaction: $2OH^-\rightarrow H_2O+½O_2+2e^-$ (1)

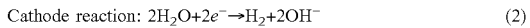

Cathode reaction: $2H_2O+2e^-\rightarrow H_2+2OH^-$ (2)

In water electrolysis, the anode generates oxygen while the cathode generates hydrogen, and an oxygen overvoltage at the anode and a hydrogen overvoltage at the cathode cause power loss. This requires that the anode and the cathode for use in alkaline water electrolysis be formed of a material that produces a low oxygen overvoltage and a low hydrogen overvoltage, and is corrosion resistant to highly corrosive alkaline water, such as caustic alkali, used as the electrolytic solution, and is thus unlikely to dissolve into the electrolytic solution.

Accordingly, an electrolysis system in these days generally uses a nickel-based material for the base member of the anode and of the cathode. Examples of material of a catalyst layer each used in the anode and in the cathode include the materials listed below.

[1] Raney nickel (Patent Literature 1): nickel catalyst containing sulfur,

[2] Platinum-group metals (Patent Literatures 2 to 4),

[3] Platinum-group metal oxides, such as ruthenium oxide and iridium oxide (Patent Literature 5),

[4] Alloy of a first metal containing at least one selected from iron, titanium, niobium, zirconium, tantalum, tin, molybdenum, and bismuth, and a second metal containing at least one selected from nickel, cobalt, silver, and platinum (Patent Literature 6),

[5] Nickel-based alloy system such as Ni—Co and Ni—Fe; nickel having an enlarged surface area; and spinel ceramic materials $Co_3O_4$ and $NiCo_2O_4$(Patent Literatures 7 and 8), and

[6] Electrically conductive oxides having a perovskite structure, such as $LaCoO_3$ and $La_{0.6}Sr_{0.4}CoO_3$ (Patent Literature 9).

The cathode catalyst used is ruthenium, rhodium, palladium, osmium, iridium, platinum, and/or Raney nickel.

However, use of renewable energy, such as a solar panel or wind power, as the power source needs a frequent intermittent operation (for example, starting and stopping of operation in the daytime). Harsh conditions such as short start/stop cycles and rapid load changes present a problem of degradation in anode performance and in cathode performance of Ni (including Raney nickel)-based anode and cathode. This is likely to be because nickel is stable in a divalent hydroxide form in alkaline solution. In addition, oxidation reaction of nickel metal is known to proceed near a potential of oxygen generation reaction for thermodynamic reasons, and formation reaction of nickel oxide shown below is likely to proceed (nickel corrodes to form nickel oxide).

$Ni+2OH^-\rightarrow Ni(OH)_2+2e^-$ (3)

As the potential increases, the nickel compound is further oxidized to be trivalent, and then tetravalent as shown in the equations below.

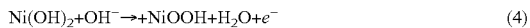

$Ni(OH)_2+OH^-\rightarrow +NiOOH+H_2O+e^-$ (4)

$NiOOH+OH^-\rightarrow NiO_2+H_2O+e^-$ (5)

That is, alkaline water electrolysis can be expected to generate only a low level of gas, and thus cause active plating deposition to occur at or below a potential that allows hydrogen and oxygen to be generated. A possible reason is as follows. When the potential is in a range that allows gas to be actively generated, reaction reducing metal ions to metal, which is deposited, and reaction that generates gas may conflict each other, and the deposition process may be hindered by the gas generated.

Taking into consideration the above viewpoints, an operating condition that involves frequent stopping of operation will maintain the potential within a range in which no hydrogen nor oxygen is generated. Under such condition, the material is readily corroded. In such an aspect, a condition exists in which not only the material of the anode, but also the material of the cathode is readily corroded.

When the alkaline water electrolysis described above is not in operation, a reverse current flows. The occurrence of a reverse current during immersion of the cathode in a concentrated alkaline water causes the reaction of above equations (3) to (5) to proceed. That is, the nickel-based base member dissolves into the electrolytic solution, and as the cathode base member dissolves, the catalyst is also removed.

To prevent degradation in cathode performance, a measure may be taken to provide a cathodic protection rectifier in the alkaline water electrolysis apparatus to continuously supply a weak current during non-operation. In addition, a measure is also under consideration to manufacture a cathode that would not be degraded even when a reverse current flows.

Patent Literature 10 discloses a method for restoring activity of the cathode without removing the cathode from the cell, by addition of a soluble platinum-group compound into the cathode chamber if the cathode is degraded by brine electrolysis.

Patent Literature 11 discloses a method for restoring activity of the cathode by forming an active coating on the nickel electrode by addition, to the cathode solution, of a water-soluble or alkali-soluble platinum solution containing a soluble platinum compound if the cathode is degraded by brine electrolysis.

Patent Literature 12 discloses a method for protecting the active cathode by maintaining the potential of the active cathode at a more negative potential than a potential that causes degradation of the active cathode, and for protecting the anode by allowing the chemical species on a surface of the anode to be reduced to metal nickel, by regulating the charge-discharge capacity of the cathode chamber to a value ranging from the charge-discharge capacity of the anode chamber to twice that capacity. It is believed that this method can prevent the performance of the oxygen electrode and of the hydrogen electrode from degrading, and thus prevent the electric energy conversion efficiency from being decreased even when a leakage current flows in the water electrolytic cell during, for example, no operation of the water electrolytic cell.

CITATION LIST

Patent Literature

Patent Literature 1: JP 55-011132 A
Patent Literature 2: JP 57-052432 B
Patent Literature 3: JP 61-010557 B
Patent Literature 4: JP 2009-242922 A
Patent Literature 5: JP 57-198289 A
Patent Literature 6: JP 57-200581 A
Patent Literature 7: JP 01-028837 B
Patent Literature 8: JP 61-250189 A
Patent Literature 9: JP 2009-179871 A
Patent Literature 10: JP 64-11988 A
Patent Literature 11: JP 2013-213284 A
Patent Literature 12: JP 2015-183254 A

SUMMARY OF INVENTION

Technical Problem

The present inventors have conducted studies and have found that frequent repetition of a stop/start cycle during alkaline water electrolysis rapidly degrades electrode performance. For example, it has been found that repetition of a cycle of operation in the daytime and shutdown at night causes the initial electrode performance to degrade, and the voltage to increase by about 100 mV in about three months. Such an operating condition may be preset by an operator, but may also occur if renewable energy, such as sunlight or wind power, is used as the power source. It is also foreseeable that use of renewable energy as the power source will result in degradation in electrode performance also caused by a significant variation with respect to load variation depending on weather conditions.

A measure against reverse current that introduces a cathodic protection rectifier requires a space for installation in the apparatus, and requires individual power control. Moreover, generation of oxygen and hydrogen respectively at the anode and at the cathode caused by supply of positive current further requires a consideration of safety, including appropriate purging of generated gas.

One possible solution for avoiding occurrence of reverse current is to remove electrolytic solution from the anode chamber and from the cathode chamber each time an electrolysis operation is stopped. However, such control is complex, and if the anode chamber and the cathode chamber have large capacities, removing and pouring the electrolytic solution will require a long time. Accordingly, application of such method is impracticable in cases where a cycle of starting and stopping of alkaline water electrolysis is frequently repeated, and/or where alkaline water electrolysis is performed using electricity having a significant output variation, such as electricity generated using renewable energy.

Patent Literatures 10 and 11 describe that ions are deposited on the cathode surface during an electrolysis operation, thereby activating the cathode catalyst to allow cathode performance to be restored. However, Patent Literatures 10 and 11 relate to a brine electrolysis method, and have the following drawbacks.

(A) A brine electrolysis method continuously discharges caustic soda generated in the cathode chamber by electrolysis, as the product, to an outside of the system together with the electrolytic solution. The platinum-group metal compound added to the electrolytic solution in the cathode chamber is only partially deposited on the electrode surface, and the platinum-group metal ions unsuccessful in deposition is discharged to an outside of the system together with the electrolytic solution, thereby reducing deposition efficiency. In addition, a platinum-group metal compound is very high in cost. From an economical point of view, the amount of discharged platinum-group metal compound needs to be minimized. This requires continuous monitoring of cathode performance to detect degradation of the cathode, and requires addition of the platinum-group metal compound to the electrolytic solution each time degradation of the cathode is detected, thereby complicating the control. Moreover, optimization is needed for operating conditions, such as operating conditions such as the operational current density, the amount of addition, and the circulation time, and the location of addition of platinum predetermined as near an electrolytic cell inlet. Furthermore, a facility for adding the platinum-group metal compound to the electrolytic solution needs to be further provided.

(B) Due to incorporation as an impurity into the caustic soda product, the platinum-group metal compound can only be added at a minimum level. Therefore, the methods disclosed in Patent Literatures 10 and 11 have been recognized as incapable of adding the platinum-group metal compound in an amount sufficient to restore the catalyst activity, and thus incapable of restoring the cathode performance to a sufficient level.

(C) In brine electrolysis, the cathode solution and the anode solution circulate separately without mixing with each other. Addition of a platinum-group compound to the cathode chamber does not cause the platinum-group metal compound (platinum ions) to be mixed to the anode solution. Thus, even when a reverse current flows during non-operation of electrolysis, the technologies of Patent Literatures 10 and 11 never cause platinum ions to be deposited on the anode surface, and allow anode performance to be restored.

The method described in Patent Literature 12 involves complex operational control to add a platinum-group metal compound (platinum ions), and moreover, is incapable of sufficiently preventing degradation in anode and cathode performance.

It is an object of the present invention to provide an alkaline water electrolysis method capable of reducing or preventing degradation in cathode performance even in an operation of repeated cycles of frequent starting and stopping, and/or even in an operation involving a significant output variation. It is another object of the present invention to provide an alkaline water electrolysis method capable of simultaneously reducing or preventing degradation in cathode performance, and reducing or preventing degradation of the anode.

Solution to Problem

To achieve the above object, according to a first solution of the present invention, there is provided an alkaline water electrolysis method for electrolyzing an alkaline electrolytic solution using an alkaline water electrolyzer having an anode chamber housing an anode, a cathode chamber housing a cathode, and a diaphragm separating the anode chamber from the cathode chamber, the method including: an electrolysis step of performing alkaline water electrolysis in the alkaline water electrolyzer, including storing the electrolytic solution in a circulation tank, feeding the electrolytic solution stored in the circulation tank to the anode chamber and to the cathode chamber, returning a cathode-side electrolytic solution generated in the cathode chamber and an anode-side electrolytic solution generated in the anode chamber to the circulation tank, mixing together the cathode-side electrolytic solution and the anode-side electrolytic solution in the circulation tank, and circulating the mixed electrolytic solution between the cathode chamber and the circulation tank and between the anode chamber and the circulation tank; and a step of adding a catalyst activation material formed of a metal salt soluble in the electrolytic solution prior to starting of the electrolysis step, wherein in the electrolysis step, a metal component in the catalyst activation material is deposited on a surface of the cathode.

To achieve the above object, according to a second solution of the present invention, there is provided the alkaline water electrolysis method, wherein during a period in which the electrolysis step is not performed, a reverse current flows to cause a metal component in the catalyst activation material to be deposited on a surface of the anode.

To achieve the above object, according to a third solution of the present invention, there is provided the alkaline water electrolysis method, wherein after starting of the electrolysis step, the catalyst activation material is further added to the electrolytic solution during the electrolysis step.

To achieve the above object, according to a fourth solution of the present invention, there is provided the alkaline water electrolysis method, wherein, in the electrolysis step, pure water is added to the electrolytic solution to maintain an alkali concentration of the electrolytic solution at a predetermined concentration.

To achieve the above object, according to a fifth solution of the present invention, there is provided the alkaline water electrolysis method, wherein the catalyst activation material is a compound of at least one metal selected from the group consisting of ruthenium, palladium, iridium, platinum, nickel, and cobalt.

To achieve the above object, according to a sixth solution of the present invention, there is provided the alkaline water electrolysis method, wherein the catalyst activation material is deposited on the surface of the cathode in an amount ranging from 0.1 to 15 $g/m^2$ in terms of the metal component.

To achieve the above object, according to a seventh solution of the present invention, there is provided the alkaline water electrolysis method, wherein the catalyst activation material is deposited on the surface of the anode in an amount ranging from 0.1 to 15 g/m in terms of the metal component.

To achieve the above object, according to an eighth solution of the present invention, there is provided the alkaline water electrolysis method, wherein the anode has a structure in which an anode catalyst material formed of at least one selected from the group consisting of Raney nickel, nickel oxide, nickel cobalt oxide, cobalt oxide, lanthanum-doped cobalt oxide, lanthanum strontium cobalt oxide, zinc cobalt oxide, ruthenium oxide, rhodium oxide, palladium oxide, osmium oxide, iridium oxide, and platinum is coated on a surface of an electrically conductive base member.

To achieve the above object, according to a ninth solution of the present invention, there is provided the alkaline water electrolysis method, wherein the cathode has a cathode catalyst material formed of at least one selected from the group consisting of ruthenium, rhodium, palladium, osmium, iridium, platinum, and Raney nickel is coated on a surface of an electrically conductive base member.

To achieve the above object, according to a tenth solution of the present invention, there is provided the alkaline water electrolysis method, wherein the conductive base member is made of at least one selected from the group consisting of nickel, a nickel-based alloy, iron, an iron-based alloy, and a carbon material.

Advantageous Effects of Invention

An alkaline water electrolysis method according to the present invention provides the following advantages.

(1) The alkaline water electrolysis is performed such that an electrolytic solution is fed to an anode chamber and to a cathode chamber, and a cathode-side electrolytic solution generated in the cathode chamber and an anode-side electrolytic solution generated in the anode chamber are returned to a circulation tank. The cathode-side electrolytic solution and the anode-side electrolytic solution are mixed together in the circulation tank. The mixed electrolytic solution is circulated to the cathode chamber and to the anode chamber, where electrolysis is performed. Thus, no electrolytic solution is discharged to an outside of the system during a normal operation, and therefore a catalyst activation material can be added to the electrolytic solution prior to starting an electrolysis process. As such, the catalyst activation material will not be consumed except for when deposition is formed on an anode or cathode surface, thereby permitting the catalyst activation material to be effectively used. Moreover, there is no need to detect degradation of the cathode before addition of the catalyst activation material unlike the case of brine electrolysis, thereby making the process simple.

Note that, in the present invention, the catalyst activation material may be added to the electrolytic solution after an electrolysis operation starts.

(2) Addition of the catalyst activation material to the electrolytic solution prior to starting of an operation enables the metal component in the catalyst activation material to be deposited on a cathode surface during the electrolysis step even under a condition of repeated cycles of stopping electrolysis and restarting electrolysis.

(3) Alkaline water electrolysis allows a same electrolytic solution to be fed to the anode chamber and to the cathode chamber. Thus, addition of the catalyst activation material to the electrolytic solution prior to starting of an electrolysis process causes the metal component in the catalyst activation material to be deposited on the cathode during operation of electrolysis, and the metal component in the catalyst activation material to be deposited on the anode during non-operation of electrolysis due to reverse current. That is, performance of both the anode and the cathode can be restored through reactivation. This enables a continuous long-term operation by repeating of regeneration of the electrodes.

BRIEF DESCRIPTION OF DRAWINGS

FIG. 1 is a flow diagram illustrating one embodiment of the alkaline water electrolysis method of the present invention.

DESCRIPTION OF EMBODIMENTS

An embodiment of the present invention will be described below with reference to the drawings.

FIG. 1 is a flow diagram illustrating one embodiment of the alkaline water electrolysis method of the present invention. In FIG. 1, reference numeral 1 denotes an alkaline water electrolyzer. The alkaline water electrolyzer 1 includes an anode chamber 2 housing an anode, a cathode chamber 3 housing a cathode, and a diaphragm 4 separating the anode chamber 2 from the cathode chamber 3.

(Anode and Cathode)

The anode and the cathode are each formed of an electrically conductive (hereinafter referred to simply as conductive) base member, and a layer (catalyst layer) formed of an anode catalyst material or a cathode catalyst material, coating the conductive base member. Alternatively, the anode and the cathode may be configured to include no anode catalyst material and no cathode catalyst material on a surface of the conductive base member, and to use the conductive base member without a coating. In this case, a conductive base member used may be treated by sandblasting of the surface to have a roughened surface as described below.

(Conductive Base Member)

The conductive base member of each of the anode and the cathode is formed of a material selected from the group consisting of nickel, a nickel-based alloy, iron, an iron-based alloy, and a carbon material. Among these, nickel metal or a nickel alloy is preferred.

The conductive base member may have a net-like structure, a plate-like shape, an expanded metal form, or the like. Preferably, the conductive base member is an expanded metal. Providing the conductive base member with surface irregularities by a process such as blasting or etching improves the adhesion between the catalyst layer and the conductive base member. The conductive base member preferably has a thickness in a range of from 0.5 to 2.0 mm, and more preferably in a range of from 0.8 to 1.3 mm.

(Cathode Catalyst Material)

The catalyst layer of the cathode includes a cathode catalyst formed of at least one selected from the group consisting of ruthenium, rhodium, palladium, osmium, iridium, platinum, and Raney nickel.

(Anode Catalyst Material)

The catalyst layer of the anode includes an anode catalyst formed of at least one selected from the group consisting of Raney nickel, nickel oxide, nickel cobalt oxide, cobalt oxide, lanthanum-doped cobalt oxide, lanthanum strontium cobalt oxide, zinc cobalt oxide, ruthenium oxide, rhodium oxide, palladium oxide, osmium oxide, iridium oxide, and platinum.

The catalyst layers of the anode and of the cathode are formed using a thermal spraying method, a plating method, a dispersion coating method, or a thermal decomposition method.

(Diaphragm)

The diaphragm 4 may be any one of a neutral diaphragm, a fluorine-based cation exchange membrane, a hydrocarbon-based cation exchange membrane, a fluorine-based anion exchange membrane, and a hydrocarbon-based anion exchange membrane.

(Alkaline Water Electrolyzer)

An alkaline water electrolyzer 1 may be a two-chamber electrolyzer having an anode and a cathode in the respective sides of the diaphragm 4. In this case, depending on the arrangement of the anode and the cathode, the alkaline water electrolyzer 1 may be a zero-gap electrolyzer having the anode and the cathode in tight contact with the diaphragm 4, a finite gap electrolyzer having the anode and the cathode disposed with only a small gap from the diaphragm 4, a gap-type electrolyzer having the anode and the cathode disposed spaced apart from the diaphragm 4, and the like.

Depending on the current density during operation, an operational differential pressure is preferably provided between the anode chamber and the cathode chamber to prevent the position of the diaphragm from shifting and an amplitude, or to avoid damage of the diaphragm 4 during operation. The operational differential pressure is preferably in a range of from 50 to 500 mmH$_2$O. This differential pressure is also advantageous in controlling the ratio of the oxygen gas generated in the anode chamber 2 that migrates into the hydrogen gas generated in the cathode chamber 3.

If the diaphragm is a neutral diaphragm, reduction in the pore diameter in the diaphragm used, or use of a diaphragm having a specially-treated surface, can also reduce migration of oxygen gas generated in the anode chamber 2 into the cathode chamber 3, or migration of hydrogen gas generated in the cathode chamber 3 into the anode chamber 2.

In FIG. 1, reference numeral 5 denotes a circulation tank; reference numeral 6 denotes an alkaline water tank for storing concentrated alkaline water 7; reference numeral 8 denotes a feed pump; reference numeral 9 denotes a pure water tank for storing pure water 10; and reference numeral 11 denotes a feed pump. The circulation tank 5 stores electrolytic solution 16, which is alkaline water having a concentration adjusted to a predetermined concentration. The alkaline water tank 6 is generally used only for adjusting the concentration of the electrolytic solution 16 before operation.

(Electrolytic Solution and Concentration Thereof)

The alkaline water electrolysis performed in this embodiment uses an electrolytic solution prepared by addition of pure water to concentrated alkaline water to achieve a predetermined alkali concentration. The alkali is preferably a caustic alkali, such as caustic potash or caustic soda.

The alkali concentration is preferably in a range of from 1.5 to 40 percent by mass (mass %). In view of low power consumption, the alkali concentration is more preferably in a range of from 15 to 40 mass % due to high electrical conductivity. Moreover, in view of the cost, corrosivity, viscosity, and operability related to the electrolysis, the alkali concentration is particularly preferably in a range of from 20 to 33 mass %.

Before an operation, the electrolytic solution 16 stored in the circulation tank 5 is adjusted in terms of concentration thereof. The feed pump 11 feeds the pure water 10 in the pure water tank 9 to the circulation tank 5. The feed pump 8 feeds the alkaline water 7 to the circulation tank 5. The alkaline water and the pure water are mixed together in the circulation tank 5 to generate the electrolytic solution 16, which is alkaline water having a concentration adjusted to a predetermined concentration.

In FIG. 1, reference numerals 12a and 12b each denote a circulation pump; reference numerals 13a and 13b each denote a heat exchanger; and 14a and 14b each denote a gas-liquid separator. The circulation pump 12a and the heat exchanger 13a are provided in a line that feeds the electrolytic solution 16 from the circulation tank 5 to the anode chamber 2. The gas-liquid separator 14a is provided in a line that feeds the electrolytic solution in the anode chamber 2 from the anode chamber 2 to the circulation tank 5. The circulation pump 12b and the heat exchanger 13b are provided in a line that feeds the electrolytic solution 16 from the circulation tank 5 to the cathode chamber 3. The gas-liquid separator 14b is provided in a line that feeds the electrolytic solution in the cathode chamber 3 from the cathode chamber 3 to the circulation tank 5. Reference numeral 15a denotes an anode-side water seal device, and reference numeral 15b denotes a cathode-side water seal device.

The electrolytic solution 16 in the circulation tank 5 is fed through the circulation pump 12a and the heat exchanger 13a to the anode chamber 2 of the alkaline water electrolyzer 1, and is also fed through the circulation pump 12b and the heat exchanger 13b to the cathode chamber 3 of the alkaline water electrolyzer 1.

The electrolytic solution is electrolyzed in the anode chamber 2 and in the cathode chamber 3. The electrolysis process electrolyzes the electrolytic solution in the anode chamber 2 and in the cathode chamber 3. The electrolysis process generates an electrolytic solution concentrated at a ratio corresponding to the amount of water lost by the electrolysis and/or the like, in the anode chamber 2 and in the cathode chamber 3. Oxygen gas is generated in the anode chamber 2, while hydrogen gas is generated in the cathode chamber 3.

The electrolytically concentrated solution in the anode chamber 2 is discharged with the oxygen gas from the anode chamber 2, and is transported to the anode-side gas-liquid separator 14a. The anode-side gas-liquid separator 14a separates gas from liquid, that is, separates the generated oxygen gas from the electrolytic solution. The electrolytic solution separated is returned to the circulation tank 5. The oxygen gas separated is exhausted through the anode-side water seal device 15a to an outside of the system.

The electrolytically concentrated solution in the cathode chamber 3 is discharged with the hydrogen gas from the cathode chamber 3, and is transported to the cathode-side gas-liquid separator 14b. The cathode-side gas-liquid separator 14b separates gas from liquid, that is, separates the generated hydrogen gas from the electrolytic solution. The electrolytic solution separated is returned to the circulation tank 5. The hydrogen gas separated is exhausted through the cathode-side water seal device 15b to an outside of the system.

The anode-side electrolytic solution and the cathode-side electrolytic solution returned to the circulation tank 5 are mixed together in the circulation tank 5, and the resultant electrolytic solution 16 is then circulated to the anode chamber 2 and to the cathode chamber 3. At this point, pure water is added to the circulation tank in an amount equivalent to the amount of loss due to the electrolysis to maintain a predetermined concentration. Note that this addition operation of pure water may be performed, instead of continuously, every several hours or every half day in a batch process depending on the system and/or load current of the electrolysis process. As described above, this embodiment performs the electrolysis step of alkaline water electrolysis using a closed system.

In the alkaline water electrolyzer 1 of FIG. 1, cations (e.g., K ions) in the anode chamber 2 primarily migrate to the cathode chamber 3 passing through the diaphragm 4. This migration decreases the alkali concentration in the anode chamber 2, and increases the alkali concentration in the cathode chamber 3. The mixture process of the anode-side electrolytic solution and the cathode-side electrolytic solution in the circulation tank 5 can make the electrolytic solution fed again to the anode chamber 2 and to the cathode chamber 3 have a uniform concentration.

In the alkaline water electrolyzer 1 of FIG. 1, the electrolysis process consumes water. A portion of the water in the electrolytic solution is discharged, together with the oxygen gas and with the hydrogen gas respectively separated in the anode-side gas-liquid separator 14a and in the cathode-side gas-liquid separator 14b, to the anode-side water seal device 15a and to the cathode-side water seal device 15b. Thus, loss of water in the electrolytic solution during the electrolysis step causes electrolytic solution having a high alkali concentration to be returned to the circulation tank 5, thereby increasing the alkali concentration of the electrolytic solution 16 in the circulation tank 5. This embodiment feeds continuously or intermittently pure water to the circulation tank 5 in an amount equivalent to the amount of loss of water in the electrolysis step. This allows the alkali concentration of the electrolytic solution to be maintained at a predetermined concentration (in the range of alkali concentration of the electrolytic solution described above). More specifically, the alkali concentration of the electrolytic solution 16 in the circulation tank 5 is monitored, and the feed pump 11 feeds the pure water 10 in the pure water tank 9 to the circulation tank 5 so that the alkali concentration will not exceed a predetermined value.

In this embodiment, a catalyst activation material is added to the electrolytic solution prior to starting of the electrolysis step described above.

(Catalyst Activation Material)

The catalyst activation material is formed of a metal salt soluble in an electrolytic solution. This catalyst activation material needs to be a metal compound deposited on the anode and on the cathode, and capable of activating the catalytic function of the anode and of the cathode. More specifically, the catalyst activation material used is a compound of at least one metal selected from the group consisting of ruthenium, palladium, iridium, platinum, nickel, and cobalt.

The above metal compound is preferably a compound that dissociates to form metal ions in the electrolytic solution, and among others, a metal hydroxide. Note that chlorides of the aforementioned metals may dissociate to form chlorine ions in the electrolytic solution to generate chlorine gas at the anode, and are thus less preferred.

The aforementioned metals all have an effect of restoring performance of the anode and of the cathode. Among these, preferred metals having a large effect of restoring performance of the anode are anode activation materials having an improved catalytic function and having an effect of increasing the surface area, such as nickel and iridium. Meanwhile, preferred metals having a particularly large effect of restoring performance of the cathode are cathode activation materials containing a noble metal material, such as platinum and ruthenium.

The easiest process for introducing a catalyst activation material is to add the catalyst activation material in advance to the electrolytic solution 16 in the circulation tank 5. However, this embodiment is not limited to this, but the catalyst activation material may be added to the electrolytic solution at any location where the electrolytic solution flows. For example, an inlet may be provided in the lines that feed the electrolytic solution from the circulation tank 5 to the anode chamber 2 and to the cathode chamber 3. In addition, an electrolysis process may also be started before the electrolytic solution containing the catalyst activation material reaches the alkaline water electrolyzer.

Starting of an electrolysis step causes the electrolytic solution containing the catalyst activation material to start circulating between the alkaline water electrolyzer 1 and the circulation tank 5. In the cathode chamber 3, the metal component in the catalyst activation material is deposited on the cathode surface (on the catalyst layer of the cathode, or on the conductive base member of the cathode).

Stopping of the electrolysis step causes a reverse current to start to flow between the cathode and the anode. This reverse current tends to cause oxidation and/or dissolution of the conductive base member (nickel material etc.) of the cathode, and if the electrode is coated with a catalyst, cause oxidation, dissolution, exfoliation, and/or the like of the catalyst. Dissolution of the base member results in removal of the catalyst layer on the cathode surface from the cathode, and thus cathode performance degrades. If no cathode catalyst layer is provided and the metal component in the catalyst activation material is deposited on the conductive base member, the deposit layer is removed from the cathode, and thus cathode performance degrades.

Restarting of the electrolysis step causes the metal component in the catalyst activation material to start to be deposited again on the cathode surface in a similar manner to the manner described above. Deposition of the catalyst activation material reactivates the cathode, and thus restores cathode performance.

The alkaline water electrolysis process transports the catalyst activation material also to the anode chamber 2 in the electrolysis step. In the electrolysis step, generation of oxygen gas in the anode chamber 2 exposes the catalyst layer on the anode surface to an oxidation region. Although the coating of an oxide that has been treated using a thermal decomposition method is relatively stable, coating that has been coated using other coating method tends to be gradually removed from the anode. This tendency increases in frequent stopping of an operation, thereby causing anode performance of the alkaline water electrolysis degrades.

Meanwhile, if the electrolytic solution contains a catalyst activation material, stopping of the electrolysis step causes the metal component in the catalyst activation material to be deposited on the anode surface due to reverse current. Deposition of the catalyst activation material reactivates the anode, and thus restores anode performance when the electrolysis step restarts.

The metal component in the catalyst activation material is deposited on the cathode during operation of electrolysis, and is deposited on the anode during non-operation of electrolysis. Thus, an amount required for restoring performance of both the anode and the cathode needs to be added to the electrolytic solution before an electrolysis step. Moreover, a repetitive operation of starting and stopping of electrolysis increases the amounts of deposition on the anode and on the cathode. Electrical power generated primarily by a solar panel may well induce stopping of the operation every day. For example, if deposition is made on the anode and on the cathode, the amount of deposition on the conductive base member is preferably in a range of from 0.1 to 15 $g/m^2$, and more preferably in a range of from 2.5 to 5 $g/m^2$, in terms of the metal component. An amount of deposition less than 0.1 $g/m^2$ means an excessively low amount of deposition of the catalyst activation material, thereby only providing insufficient performance restoration. An amount of deposition more than 15 $g/m^2$ causes the catalyst activation material that has not been deposited to reside in the electrolytic solution like impurity. That is, use of an excess amount of the catalyst activation material increases the cost. The amount of the catalyst activation material added to the electrolytic solution prior to starting of an electrolysis step, and the amount of deposition, are adjusted to satisfy the amount of deposition described above.

As an example, assuming that the volume of each element (1 $m^2$ in size) of anode chamber and of cathode chamber is about 20 L, and the capacity of the circulation system is 40 L, the required amount of the electrolytic solution is 80 L per element in total. Considering an actual operational situation, the process of deposition on the cathode can be performed for a long time. On the assumption that 50% of the metal ion concentration added is effectively used in the process of electrolytic deposition and dissolution, an approximation of the minimum amount of the added active metal will be as follows.

$$0.1 \text{ g}/0.5 = 0.2 \text{ g}$$

Since the cell capacity is 40 L, we obtain: 0.2 g/40 L=5 mg/L.

The process capacity including the capacities of the circulation tank and of the piping can be estimated to be equivalent to 80 L. Thus, the amount to be added is 0.2 g/80 L=2.5 mg/L=2.5 $g/m^3$.

Therefore, the catalyst activation material needs to be added in advance to the electrolytic solution in an amount of 2.5 $g/m^3$ or more. This amount varies depending on the size of the electrolyzer and on the amount of circulation.

In this embodiment, the electrolytic solution 16 is electrolyzed during continuous circulation, and is not discharged to the outside except in an emergency or in need. Therefore, the catalyst activation material of the anode and of the cathode is added during an adjustment process of the electrolytic solution prior to starting of electrolysis, and always remains in the electrolytic solution in the alkaline water electrolysis apparatus. Thus, the catalyst activation material is not consumed except upon deposition on the anode or cathode surface, and is thus effectively used. In this embodiment, unlike the case of brine electrolysis, a complex process is not needed that detects degradation of the cathode and adds the catalyst activation material to prevent wasting of the catalyst activation material.

However, this embodiment may undergo continuous degradation of the cathode and of the anode if only a small amount of catalyst activation material is added, and/or if the electrolysis operation is continuously performed depending on the deposition condition. Accordingly, the catalyst activation material may be further added to the electrolytic solution even after starting of an electrolysis step when, for example, the cell pressure or the like has risen. In this case, there is no limitation on the location of addition of the catalyst activation material as described above. However, addition of the catalyst activation material to the electrolytic solution 16 in the circulation tank 5 is the easiest.

EXAMPLES

Next, examples of the present invention will be described. It is understood, however, that the present invention is not limited to these examples.

Example 1

A test was performed using an electrolyzer having an electrolytic area of 1.0 $dm^2$. A conductive base member made of Ni was used to form the anode and the cathode respectively in the anode chamber (capacity: 400 mL) and in the cathode chamber (capacity: 400 mL). The anode was an expanded mesh (thickness 0.8×SW 3.7×LW 8.0) having an active anode coating coated on the surface thereof. The cathode was a fine mesh (thickness 0.15×SW 2.0×LW 1.0) having a noble metal-based active cathode coating coated on the surface thereof.

The anode catalyst material used was a $NiCo_2O_4$ active anode catalyst. The cathode catalyst material used was a Pt-based cathode catalyst having thermal decomposition activity.

The diaphragm used was a polypropylene-based film of 200 μm in thickness, and was interposed between the both electrodes to produce a zero-gap structure.

The test process was as illustrated in FIG. 1. The electrolysis temperature was controlled by a heater provided in a bottom portion of the electrolytic cell.

The electrolytic solution used was 25 mass % caustic potash. To maintain the alkali concentration constant during the operation, pure water was continuously fed in an amount equivalent to the amount of water consumed after initial adjustment of the alkali concentration.

Prior to starting of the electrolysis step, tetraammine platinum (II) hydroxide solution was added, as the catalyst activation material, to the electrolytic solution in an amount equivalent to 4.5 g/m² of platinum.

The electrolytic solution was circulated such that the electrolytic solution was fed from the circulation tank 5 (electrolytic solution capacity: 2.5 L), provided in a lower portion of the alkaline water electrolyzer 1, to the anode chamber 2 and to the cathode chamber 3 respectively using the circulation pumps 12a and 12b at a flow rate in a range of from 40 to 60 mL/min. The gas-liquid mixtures respectively discharged from upper portions of the anode chamber 2 and of the cathode chamber 3 of the alkaline water electrolyzer 1 were separated by the gas-liquid separators 14a and 14b into gas and liquid. The liquid was returned to the circulation tank 5, while the gas was released to an outside of the system.

The drive source used was a solar panel having an output power of 200 W. Operating conditions included 40 A/dm, 25 mass % KOH, and an electrolysis temperature in a range of from 70 to 80° C. The pressure in the alkaline water electrolyzer 1 is 50 mmH₂O in terms of differential pressure with the cathode maintained under pressure for purposes of prevention of vibration of the diaphragm during operation, and of increasing hydrogen purity.

Electrolysis was continuously performed until the accumulated current value reached 160 Ah. After this, an intermittent operation of 8 hours of operation and 16 hours of shutdown was performed for three days.

Examples 2 to 6

Tests identical to the test of Example 1 were performed except that the materials illustrated in Table 1 were used as the catalyst activation material.

Example 7

The same conductive base member as that of Example 1 was used in the anode and in the cathode. In Example 7, no catalyst was provided in advance on the surface of each of the conductive base members, but the surfaces were roughened by sandblasting.

These conductive base members were respectively used in the anode chamber 2 and in the cathode chamber 3, and a test similar to that of Example 1 was performed.

Comparative Example 1

The same conductive base member as that of Example 1 was used in the anode and in the cathode. In Comparative Example 1, catalyst activation material was not added.

These anode and cathode were respectively used in anode chamber 2 and in the cathode chamber 3, and a test similar to that of Example 1 was performed. Note that Comparative Example 1 was performed such that the intermittent operation was performed for three months.

The test results of Examples 1 to 7 are shown in Table 1.

The amount of metal deposition was calculated by sampling the electrolytic solution and using the noble metal concentration residing in the electrolytic solution, which was determined using an inductively coupled plasma-mass spectrometry (ICP-MS) analyzer.

The degrees of activation of the anode and of the cathode were each determined on the basis of the reduction in cell voltage.

TABLE 1

| | Catalyst activation material | Amount of deposition (g/m²) | | Degree of Activation | | Restoration of cell voltage (mV) | |
|---|---|---|---|---|---|---|---|
| | | Cathode | Anode | Cathode | Anode | Cathode only | Both cathode and anode |
| Example 1 | Tetraammine platinum (II) hydroxide solution | 2.5 | 0.4 | Yes | Yes | 100 | 120 |
| Example 2 | Dinitrodiamine palladium (II) | 1.8 | 0.7 | Slightly | Slightly | 20 | 25 |
| Example 3 | Hexammine iridium (III) hydroxide solution | 1.2 | 0.6 | Yes | Yes | 40 | 70 |
| Example 4 | Potassium ruthenate (VI) solution | 0.9 | 0.5 | Yes | Slightly | 60 | 70 |
| Example 5 | Cobalt (III) trihydroxide | 1.7 | 1.3 | Yes | Yes | 30 | 50 |
| Example 6 | Hydroxy(oxo)nickel potassium solution | 0.7 | 0.2 | Slightly | Slightly | 25 | 30 |
| Example 7 | Tetraammine platinum (II) hydroxide solution | 2.3 | 0.3 | Yes | Yes | 80 | 100 |
| Comparative Example 1 | Not added | — | — | — | — | −100 | −130 |

As illustrated in Table 1, Examples 1 to 7 showed deposition of the metal component in the catalyst activation material on the cathode surface in the electrolysis step. In addition, a reverse current has flowed in the alkaline water electrolyzer 1 during non-operation of electrolysis. As a result, deposition of the metal component in the catalyst activation material was observed on the anode surface. In contrast, since no catalyst activation material was added in Comparative Example 1, no restoration was observed in the cathode and in the anode.

As far as the service life of electrode is concerned, Examples 1 to 6 in which a catalyst layer has initially been formed were superior to Example 7 in which no catalyst layer has been formed.

REFERENCE SIGNS LIST

1: Alkaline water electrolyzer
2: Anode chamber
3: Cathode chamber
4: Diaphragm
5: Circulation tank
6: Alkaline water tank
7: Alkaline water
8: Feed pump
9: Pure water tank
10: Pure water
11: Feed pump
12a: Circulation pump
12b: Circulation pump
13a: Heat exchanger
13b: Heat exchanger
14a: Anode-side gas-liquid separator
14b: Cathode-side gas-liquid separator
15a: Anode-side water seal device
15b: Cathode-side water seal device
16: Electrolytic solution

The invention claimed is:

1. An alkaline water electrolysis method for electrolyzing an alkaline electrolytic solution using an alkaline water electrolyzer having an anode chamber housing an anode, a cathode chamber housing a cathode, and a diaphragm separating the anode chamber from the cathode chamber, the method comprising:
performing alkaline water electrolysis in the alkaline water electrolyzer, including storing the alkaline electrolytic solution in a circulation tank, feeding the electrolytic solution stored in the circulation tank to the anode chamber and to the cathode chamber, returning a cathode-side electrolytic solution generated in the cathode chamber and an anode-side electrolytic solution generated in the anode chamber to the circulation tank, mixing together the cathode-side electrolytic solution and the anode-side electrolytic solution in the circulation tank, and circulating the mixed electrolytic solution between the cathode chamber and the circulation tank and between the anode chamber and the circulation tank; and
adding a catalyst activation material comprising a metal salt soluble in the electrolytic solution prior to starting of the performing of the alkaline water electrolysis,
wherein in the performing of the alkaline water electrolysis, a metal component in the catalyst activation material is deposited on a surface of the cathode, and
during a period in which the alkaline water electrolysis is not performed, a reverse current flows to cause the metal component in the catalyst activation material to be deposited on a surface of the anode.

2. The alkaline water electrolysis method according to claim 1, wherein after starting of the performing of the alkaline water electrolysis, the catalyst activation material is further added to the electrolytic solution during the performing of the alkaline water electrolysis.

3. The alkaline water electrolysis method according to claim 1, wherein, in the performing of the alkaline water electrolysis, pure water is added to the electrolytic solution so as to maintain an alkali concentration of the electrolytic solution at a determined concentration.

4. The alkaline water electrolysis method according to claim 1, wherein the catalyst activation material is a compound of at least one metal selected from the group consisting of ruthenium, palladium, iridium, platinum, nickel, and cobalt.

5. The alkaline water electrolysis method according to claim 1, wherein the catalyst activation material is deposited on the surface of the cathode in an amount ranging from 0.1 to 15 $g/m^2$ in terms of the metal component.

6. The alkaline water electrolysis method according to claim 1, wherein the catalyst activation material is deposited on the surface of the anode in an amount ranging from 0.1 to 15 $g/m^2$ in terms of the metal component.

7. The alkaline water electrolysis method according to claim 1, wherein the anode has a structure in which an anode catalyst material comprising at least one material selected from the group consisting of Raney nickel, nickel oxide, nickel cobalt oxide, cobalt oxide, lanthanum-doped cobalt oxide, lanthanum strontium cobalt oxide, zinc cobalt oxide, ruthenium oxide, rhodium oxide, palladium oxide, osmium oxide, iridium oxide, and platinum is coated on a surface of an electrically conductive base member of the anode.

8. The alkaline water electrolysis method according to claim 1, wherein the cathode has a structure in a cathode catalyst material comprising at least one material selected from the group consisting of ruthenium, rhodium, palladium, osmium, iridium, platinum, and Raney nickel is coated on a surface of an electrically conductive base member of the cathode.

9. The alkaline water electrolysis method according to claim 7, wherein the conductive base member comprises at least one material selected from the group consisting of nickel, a nickel-based alloy, iron, an iron-based alloy, and a carbon material.

* * * * *